Feb. 27, 1934.       C. F. REIS       1,948,829
ROTOR FOR MAGNETOS
Filed Aug. 29, 1932
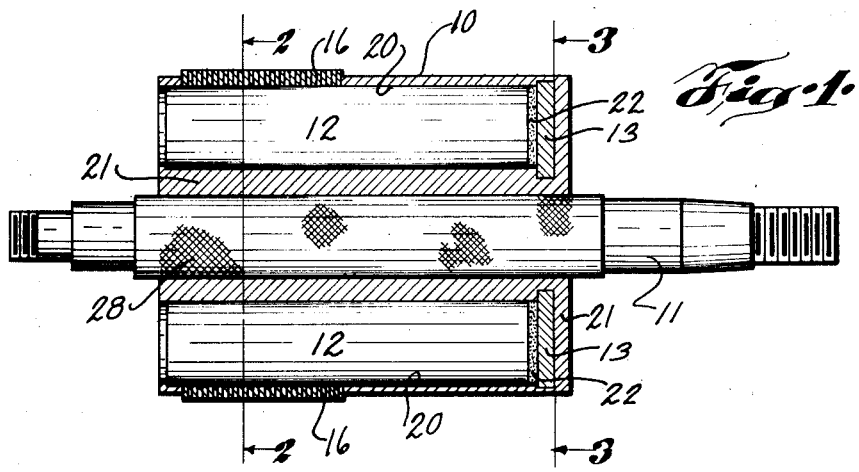
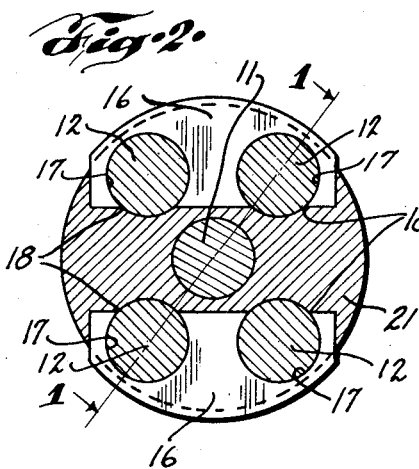
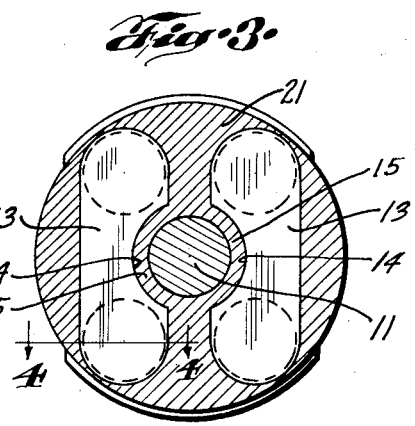
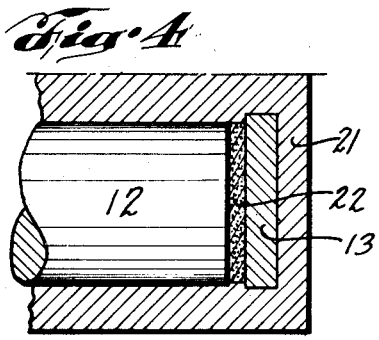
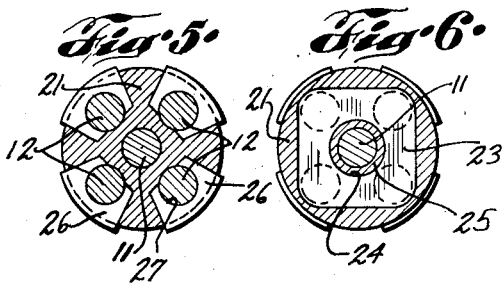
INVENTOR.
CURT F. REIS
BY
ATTORNEY.

Patented Feb. 27, 1934

1,948,829

UNITED STATES PATENT OFFICE 1,948,829

ROTOR FOR MAGNETOS

Curt F. Reis, Beloit, Wis., assignor to Fairbanks, Morse & Co., Chicago, Ill., a corporation of Illinois Application August 29, 1932, Serial No. 630,876

4 Claims. (Cl. 171—252)

This invention relates to improvements in rotors for magnetos, and more particularly to improvements in rotors for magnetos of the type employing rotating permanent magnets.

In certain prior types of magnet rotors, it is known to employ a mass of cast non-magnetic metal, such as brass, for positioning laminated pole shoes, for the rotor shaft, as well as for the purpose of intimately uniting the laminations of the pole shoes. Such structures are objectionable, in that a cast shaft is comparatively low in rigidity, and is rather expensive shafting material. In magnetos of this type, it is desirable to employ permanent magnets formed of cobalt steel, or other materials having high magnetic retentivity. Such materials have not been widely used in magnetos because of the difficulty experienced in machining, and in securing the pole pieces to the rotor. In prior types of rotor constructions, it is usual to employ screws or other like fastening means for securing the permanent magnets and the various other parts to the rotor shaft. Such constructions are objectionable in that the screws may, and often do, become loose and ineffective, and involve expensive drilling and tapping operation in an extremely hard metal.

An object of the present invention is to provide an improved rotor for magnetos of the type above noted, which includes a rotor shaft formed of steel or other similar material, and a mass of die-cast aluminum or zinc alloy for intimately uniting the laminated pole shoes to the shaft. By this provision, a shaft of substantial strength and rigidity is employed in the rotor assembly.

A further object is to provide an improved construction of rotors of magnetos of the rotating field type, which includes a mass of die-cast non-magnetic metal for securing the laminated pole shoes and a magnetic bridging member, to the rotor shaft, and involving the use of a magnetic plastic cement for securing the pole pieces into intimate assembled relation with the pole shoes and bridging member.

A still further object is to provide an improved rotor for magnetos of the rotating field type, in which the laminated pole shoes and the magnetic pole-bridging member are firmly assembled to the rotor shaft by means of a mass of die-cast non-magnetic metal, and in which the pole pieces are assembled and more firmly secured to the die cast mass, than is possible through the use of screws, bolts, nuts or the like.

An additional object is to provide an improved rotor for magnetos of the rotating field type, which is rigid and durable in construction, and is composed of but a few simple and easily assembled parts, and which results in a substantial reduction of production costs, through minimization of machining operations on the permanent magnets.

Further objects and advantages will appear from the following detailed description of parts, and the accompanying drawing of a single preferred embodiment, and in which:

Fig. 1 is a longitudinal section of a preferred form of rotor for magnetos of the rotating field type, the section being taken along line 1—1 of Fig. 2; Fig. 2 is a section taken along line 2—2 in Fig. 1; Fig. 3 is a section taken along line 3—3 in Fig. 1; Fig. 4 is an enlarged fragmentary section taken along line 4—4 in Fig. 3; Fig. 5 is a reduced section taken along line 2—2 in Fig. 1, and showing a modified pole shoe construction; and Fig. 6 is a reduced section taken along line 3—3 in Fig. 1 and showing a modified form of magnet-bridging member to be employed in connection with the pole shoe construction shown in Fig. 5.

Referring by numerals to the drawing, the numeral 10 designates, generally, a preferred form of rotor for magnetos of the rotating field type, and which includes a rotor shaft 11 formed, by preference, of mild steel or other similar shafting material of substantial strength and rigidity. A plurality of pole pieces or permanent magnets 12 are, by preference, arranged in spaced relation and substantially parallel to each other, and to the shaft. These pole pieces are, by preference, formed of cobalt steel or other material possessing high magnetic retentivity, and are formed, by preference, of circular cross section to facilitate the few necessary machining operations. In the preferred example shown, the rotor 10 includes four such pole pieces, although it will be understood that the number may be varied, depending upon the type and number of poles of the magneto to be constructed.

Referring more particularly to Figs. 2 and 3, wherein the parts of the rotor are arranged for a two pole machine, a pair of bridging members 13 of stamped soft iron or steel, are disposed near one end of the rotor and each in contact with the end portions of a pair of the pole pieces 12 of opposed polarity. Each bridging member provides a flux path between the paired pole pieces of opposite polarity, to provide a structure which is, in effect, a U shaped permanent magnet. By this arrangement there are provided two distinct magnetic circuits within the rotor, where a two pole machine is desired. Each bridging member 13 is provided with an intermediate semi-circular recessed portion 14. By reason of this construction, there results an annular space 15 which separates the shaft 11 from the opposed recessed inner margins of the members 13. Pole shoes 16 are provided, and consist of stacks of soft iron laminations, each of partly sector shape, which are arranged, respectively, on the free ends of the pole pieces 12, each pole shoe connecting the pole pieces of like polarity. Each lamination is, by preference, provided with a pair of apertures 17 which are slotted as indicated at 18, the pole pieces extending through these apertures. It will be readily seen that the pole shoes 16 only partially encircle the paired pole pieces, because of the slotted portion 18 of the laminations.

In assembling the rotor, the laminated pole shoes, bridging members 13, together with the rotor shaft, are suitably positioned in a die-casting mold. The mold, prior to casting, is provided with cores corresponding in size and shape with, and so as to result in, openings 20. A mass of non-magnetic metal 21, such as a suitable aluminum or zinc alloy is then poured into the mold for intimately uniting to the shaft, the assembled laminations for the pole shoes, and the bridging members. After the die-casting process, the resulting rigid, integral structure is removed from the mold, the cores corresponding to openings 20 removed from the casting, and a layer of magnetic plastic cement 22, consisting of any suitable metallic cementitious substance, is applied through the openings 20 and pressed into contact with the bridging members 13. Then the pole pieces are inserted through the pole shoe apertures 17 and the cored openings 20, and forced into contact with the mass of magnetic cement 22. A cement found suitable for the present purpose is well known to the trade for external application to boiler joints, steam and water pipe joints, etc., or in lieu of such prepared materials there may be utilized certain of the organic metallic compounds now employed for cementing metals. Still another cement may be formed of certain silicates possessing setting properties, with which is admixed a suitable proportion of finely divided particles of a magnetic metal. The magnetic properties of the cement may be provided or augmented by incorporating therewith, a quantity of finely divided iron filings. The cement, after hardening within the assembly, insures good magnetic contact between the bridging members and the pole pieces, and prevents any appreciable endwise or rotary movement of the pole pieces relative to the cast portions of the structure. Each mass of cement serves to hold a pair of the pole pieces, of opposed polarity, in assembly. The rotor is now completely assembled and ready for use in a magneto, and it will be apparent that by the above arrangement all screws or threaded fastening means for assembling the rotor, are eliminated, a much easier and more secure assembly expedient being provided by the mass of magnetic plastic cement.

In Figs. 5 and 6 certain of the rotor parts are shown as arranged for a four pole machine. In this modification, a plate 23 of stamped soft iron or steel is disposed near one end of the pole pieces 12, in place of the separate bridging members 13 employed in the above described two-pole machine. The plate 23 provides a flux path common to all the pole pieces. A central circular aperture 24 is punched in the plate 23 which, when the plate is assembled in the rotor, causes the plate to be separated from the shaft 11 by an annular web 25 of the casting metal. Pole shoes 26 consisting of stacks of soft iron laminations, are arranged on the free ends of each pole piece, to form four separate and distinct poles. Each lamination is provided with a slotted aperture 27 similar to that shown in Fig. 2. It will be readily seen that the various parts are assembled in substantially the same manner as described for the two pole machine.

In either construction above described, it will be seen that the mass of non-magnetic metal secures the various parts of the rotor to the shaft, and that a web of non-magnetic metal, magnetically insulates the bridging members 13 or the plate 23 from the shaft. The use of magnetic plastic cement for holding the pole piece in place, eliminates expensive and difficult machining operations on the hard steel magnets. The only machining operation, viz., that of grinding the pole pieces 12 to length and size is simple and inexpensive, as compared to the machining necessary with prior types of rotors. It will also be readily seen that all the parts of the rotor, with the exception of the pole pieces 12 are metallically united into a rigid unitary structure, in the die-casting process.

The rotor shaft 11 is, by preference, provided with a knurled portion 28 to insure good interengaging coherence between the mass of cast metal 21 and the shaft. This knurled portion, due to an improved bond, prevents any relative movement between the cast metal 21 and the shaft. It will be apparent that the present improved rotor is neat and compact in construction, and forms a permanently rigid, rotating mass. It will, of course, be understood that my preference is not to die-cast the pole pieces in place, since the heat developed during the die-casting process would anneal the pole pieces, resulting in a loss in magnetic retentivity. It is therefore desirable to assemble the rotor as above described, and to hold the pole pieces in place by the magnetic plastic cement heretofore referred to.

It will, of course, be understood that the present detailed description of parts and the accompanying drawing relate to only a single preferred executional embodiment of the invention, and that substantial changes may be made in the described arrangement and construction of parts without departing from the spirit and full intended scope of the invention.

I claim:

1. In an assembly of permanent magnets in a magneto of the rotating field type, a shaft, a pole piece holder of non-magnetic metal cast about said shaft, elongate pole pieces arranged in spaced parallel relation to said shaft, a member cast into said holder, and bridgingly engaging a plurality of the pole pieces, and a metallic cementitious substance structurally and magnetically cementing said pole pieces to said bridging member.

2. In an assembly of permanent magnets in a magneto of the rotating field type, a hollow cast body provided with sockets, a member bridging the inner ends of a plurality of said sockets, pole pieces within said sockets, and a magnetic cementitious substance securing said pole pieces in assembled relation to said bridging member and within said body.

3. In a magnet assembly for magnetos of the rotating field type, a shaft, a plurality of pole pieces and a bridging member, a body of non-magnetic metal cast about said shaft, and embracing said bridging member; said body having preformed sockets for receiving said pole pieces, and a magnetic cementitious substance disposed within the sockets between the end of said pole pieces and said bridging member for securing said pole pieces in assembled relation to said bridging member, and within said body.

4. In a magnet assembly for magnetos of the rotating field type, a shaft of ferrous metal, pole shoes, a plurality of pole pieces and a pole-piece-bridging member, a pole-piece holder of non-magnetic metal cast onto said shaft, and embracing said bridging member, and said pole shoes; said holder being provided with preformed longitudinally pole-piece-receiving sockets, and a magnetic cement disposed in said sockets adjacent the bridging member for cementing the pole pieces magnetically and structurally to said bridging member.

CURT F. REIS.